United States Patent [19]

Dobbs

[11] Patent Number: 4,495,635
[45] Date of Patent: Jan. 22, 1985

[54] METHOD AND APPARATUS FOR PROFILING STRUCTURAL SECTIONS

[75] Inventor: John M. Dobbs, South Hamilton, Mass.

[73] Assignee: Analogic Corporation, Wakefield, Mass.

[21] Appl. No.: 533,626

[22] Filed: Sep. 19, 1983

Related U.S. Application Data

[63] Continuation of Ser. No. 250,765, Apr. 3, 1981.

[51] Int. Cl.³ .................. G01B 15/02; G01B 15/04
[52] U.S. Cl. .................................. 378/56; 378/54; 250/359.1
[58] Field of Search .................. 378/51, 54, 55, 56; 356/73.1, 376, 379; 364/563, 560

[56] References Cited

U.S. PATENT DOCUMENTS

| | | | |
|---|---|---|---|
| 3,108,186 | 10/1963 | Flavell, Jr. | 378/59 |
| 3,808,437 | 4/1974 | Miyagawa et al. | 378/54 |
| 3,832,551 | 8/1974 | Bartlett et al. | 250/359.1 |
| 3,868,510 | 2/1975 | Murata et al. | 378/55 |
| 3,899,663 | 8/1975 | Pirlet | 356/376 |
| 4,279,513 | 7/1981 | Tucker | 356/387 |
| 4,330,835 | 5/1982 | Gehm | 378/59 |

FOREIGN PATENT DOCUMENTS

| | | | |
|---|---|---|---|
| 55971 | 7/1982 | European Pat. Off. | 378/55 |
| 2729576 | 1/1979 | Fed. Rep. of Germany | 356/376 |

OTHER PUBLICATIONS

Anon., "Thickness Gauge Coupled with Small Control Computer", Monthly Technical Review, 20 (3), Mar. 1976, VEB Vorlag Technik, Germany, p. 65.

Primary Examiner—Alfred E. Smith
Assistant Examiner—Carolyn E. Fields
Attorney, Agent, or Firm—Weingarten, Schurgin, Gagnebin & Hayes

[57] ABSTRACT

A system for profiling of structural sections with penetrating radiation in which a head includes a radiation source that projects a fan shaped radiation pattern from one side of the section to be profiled to a diametrically opposite side at which is located an array of detectors. The head is used to detect both attenuation of the rays by the section and the section position, and is not changed or reconfigured for variations in scale. A prior knowledge of the geometric shape of the section permits calculation of total cross-sectional area for weight determination or determination of geometric conformity to a predetermined standard, the calculations being derivable from the individual outputs of the detectors. Compensation for displacement of the profiled article during measurement is also provided.

6 Claims, 8 Drawing Figures

METHOD AND APPARATUS FOR PROFILING STRUCTURAL SECTIONS

This application is a continuation, of application Ser. No. 250,765, filed Apr. 3, 1981.

FIELD OF THE INVENTION

This invention relates to profiling of structural sections and more particularly to a method and apparatus for determining geometric parameters through the detection of the attenuation of a fan of penetrating radiation at a plurality of points.

BACKGROUND OF THE INVENTION

The measuring of structural sections has in the past been accomplished by a variety of means. For instance, gauging systems have utilized optical scanners are penetrating radiation to enable determination of the thickness of a rolled sheet as it is being produced. In general these techniques are one-dimensional in that they offer no two-dimensional information. This precludes the obtaining of accurate information about the conformity of a more complex shape to a given standard. This conformity to a given shape is referred to herein as the "profile" of the shape.

System which yield profile information are extremely useful in the roll forming of various products such as I-beams, channels, sheet piling, and the like, in which the products are produced in a rolling mill, with the product moving at several hundred feet per minute as it is being produced.

As an example, and not by way of limitation, I-beams are produced at a maximum speed of for instance, a thousand feet per minute. There are various critical dimensions which must be achieved during this process in order to maintain conformity to a given standard and to achieve tolerances small enough to minimize the amount of material used and thus minimize the cost of the product. By way of illustration, if in the formation of the I-beam, the weight per foot can be accurately determined in real time, automatic adjustment of the rolling mill is permitted so that the cost of the product can be reduced.

In rolling mills, the shape of the rolled section is controlled manually which, under the best of circumstances, results in a rolled product having a tolerance of about 2.5 percent. This tolerance is obtained through visual inspection of the product as it is being rolled and manual adjustment of the mill, with the 2.5 percent tolerance only achievable by the most experienced of operators.

Automatic control of the rolling process in which the positions of the rollers are automatically controlled is impossible without data to guide the adjustment. This data is extremely difficult to obtain in the type of environment presented by the rolling mill due to the temperature of the environment, amount of vibration which accompanies the manufacture of the rolled product, and the lack of cleanliness of the entire operation.

It will therefore be appreciated that electro-optical devices when utilized in a rolling mill are of limited utility because of the necessity of cleaning the optics at regular intervals. Moreover, during the rolling process the position of the rolled product is difficult to control which makes accurate real time profile measurements almost impossible. Additionally, the so-called "head" which is utilized in detecting structural parameters must be changed in geometric configuration for different sizes and shapes of the article produced.

Profiling with penetrating radiation in the past has been limited to one-dimensional thickness profiling without regard to any two-dimensional qualities or relationships of the rolled product. This gives only limited information about the structure to be profiled.

An example of strip thickness measurement is illustrated in U.S. Pat. No. 4,047,036 in which X-rays penetrate a strip and are detected by an array of detectors, the outputs of which are summed.

An example of electro-optical apparatus for measuring the thickness of a moving strip of material is illustrated in U.S. Pat. No. 3,671,726. Again only one-dimensional characteristics are measured. Electro-optical gauging is also accomplished in U.S. Pat. No. 4,121,292, in which dual cameras and a scanner are utilized. Here the system gauges two orthogonal dimensions of a moving hot bar.

It will be appreciated that the systems described in the above patents do not acquire sufficient data to permit determining the various features of a structural shape and thus, in the case of I-beams for instance, these systems cannot gauge the thickness of the web or various flanges. In the above described systems an accurate picture of the structural shape being produced is not provided, and as a result an accurate estimate of weight per foot cannot be obtained. Moreover, information is not obtainable as to which portions of the structural shape are within tolerance and there is therefore a lack of information as to which of the process parameters to vary.

In particular, in the case of I-beams, merely measuring the gross attenuation does not provide a machine operator with a measure of the thickness of the web or the flanges or indicate to the operator whether to change web thickness or the thickness of specific flanges.

SUMMARY OF THE INVENTION

In contrast to the above-identified profiling techniques, the subject technique involves two dimensional profiling of a structural section through the use of a diverging beam or fan of penetrating radiation and a corresponding array of detectors, the outputs of which are individually utilized in deriving the geometric parameters associated with the structural section. Thus, both attenuation and beam position are available, as opposed to simple gross attenuation.

As an example, cross-sectional area can be monitored and weight per unit foot of the rolled section may be ascertained. Additionally, the conformity of the structural section to a predetermined standard may be ascertained through the processing of the individual detector outputs so that thickness of the various components making up the section may be ascertained. Moreover, due to the utilization of individual detector outputs, corrections for displacement of the section during measurement may be made on a real time basis.

The use of individual detectors and certain a priori knowledge about the section and the head configuration permits measurements with penetrating radiation and especially with the type of radiation associated with an X-ray or gammaray source. Since the radiation emanates from an approximate point source, differences in scale can be accommodated using the principles of single point perspective and projection.

More specifically, a system for profiling of structural sections with penetrating radiation is disclosed in which a head is used which includes a radiation source that projects a fan shaped or diverging beam radiation pattern from one side of the structural section to be profiled to the diametrically opposite side at which is located an array of detectors. The head is not changed or reconfigured for different size sections, thus accommodating structures of varying scale. The head is therefore referred to as being "configuration-invarient". The term "configuration-invarient" as it relates to the head, means that the relationship of the detectors to the source is unchanged. In order to accommodate differences in scale, in one embodiment, the entire head assembly is moved relative to the profiled structure, such that for smaller items the source is closer to this item, as opposed to the larger scaled items in which the source is moved further away. Thus profiling can be obtained with a configuration-invarient head and with the utilization of a diverging beam radiation pattern.

A priori knowledge of the geometric shape permits calculation of total cross-sectional area for weight determinations, or determination of geometric conformity to a predetermined standard. These calculations are derivable from the outputs of the detectors which are used individually to provide attenuation with respect to beam position. When needed, compensation for transverse displacement of the profiled article during measurement may be provided since position of the edges of the profiled article may be determined by detecting which of the end detectors in the array receives an unattenuated beam.

The advantages of utilizing a configuration-invariant head in a hostile environment include the absence of moving parts within the head and the capability of a fixed head configuration regardless of the size and shape of the article to be profiled. When penetrating radiation is used, the configuration-invariant head need not be cleaned as often as heads for optical systems since detector output is not materially affected by dust and dirt associated with rolling processes.

The utilization of the diverging beam in this type of real time measuring system presents the conceptual problem of a non-orthogonal coordinate system, e.g. one in which the beams emanate in a fan from a point source. While it may seem to be desirable to utilize an orthogonal coordinate system, in general this requires either an extended source of penetrating radiation and collimators or the translation of a collimated point source during the measurement. The use of any moving parts in the head, especially in the hostile environment described, presents serious maintenance problems. As will be seen, through the use of individual detector outputs it is possible to utilize diverging beam geometry to calculate a complete set of cross-sectional parameters. The use of the divergent beam also permits simpler adjustments for the scale of the product than is obtainable for systems utilizing orthogonal coordinates.

In addition, the detector array has sufficient length to accommodate lateral displacement of the profiled article caused by vibration when the article shifts from side to side as it moves through the head. As a result of using an extended length array, outer detectors are available for determining the lateral shift of the section. Moreover, with certain cases, mathematical terms relating to the lateral position of the profiled article cancel out of the equations governing the measurement so that lateral movement of the article has no effect on the final result.

DESCRIPTION OF THE DRAWINGS

The invention will be more fully understood from the following detailed description, and the accompanying drawing, in which.

DETAILED DESCRIPTION OF THE INVENTION

Figure 1:
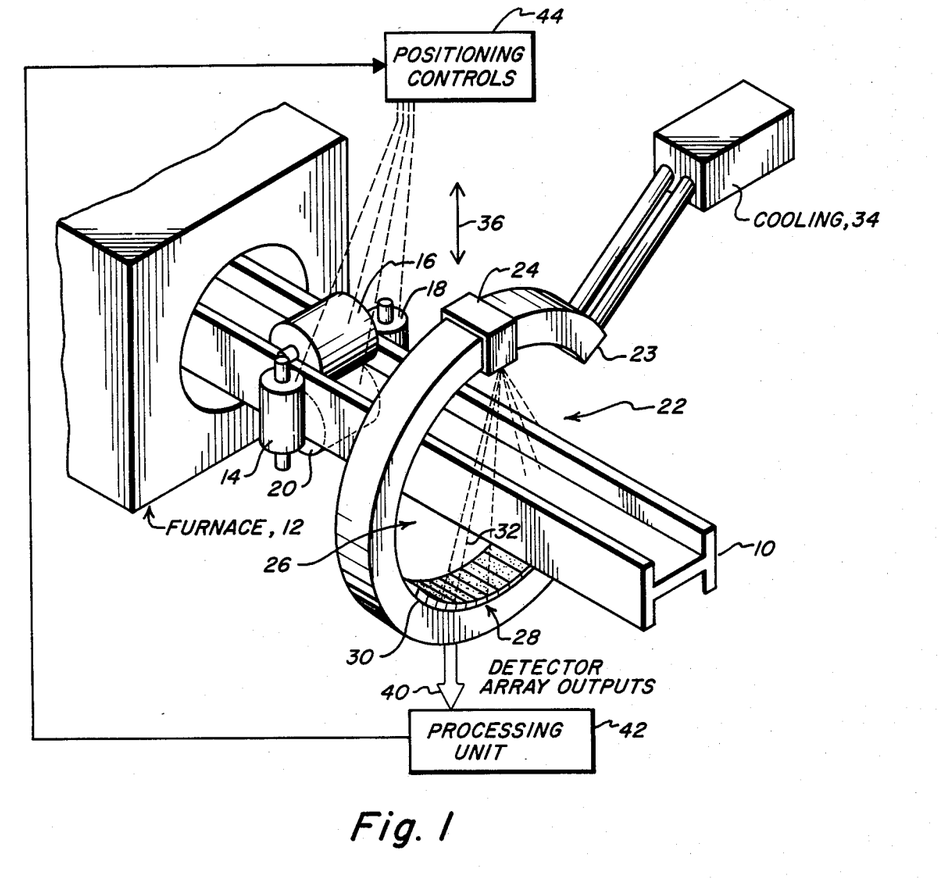
FIG. 1 is a diagrammatic illustration of the profiling system in which penetrating radiation is utilized to profile an I-beam as it emerges from a rolling mill.

Referring now to FIG. 1, there is diagrammatically shown a typical rolling mill including a furnace 12 and rollers 14, 16, 18 and 20 for producing an I-beam 10. The positioning or adjustment of rollers 14, 16, 18, and 20 determines the thickness of the I-beam webs and overall dimension of the section.

To control the rolling process in real time, a configuration-invariant head 22 including a support 23 is positioned at the mouth of the furnace. In one embodiment, support 23 is C-shaped to permit positioning the head around the I-beam to be profiled. The support carries a source 24 which may be considered a point source that projects a fan 26 of penetrating radiation through article 10 which is roll-formed. An array of detectors 28 is located diametrically opposite the source on support 23 and in a preferred embodiment, may include as many as 76 individual detectors. Each of these detectors defines a beam by virtue of its aperture such that, for instance, a detector 30 defines a beam 32 from source 24. As can be seen, the fan of radiation from source 24 is divided up into beams by virtue of its detection by plurality of adjacent detectors.

A cooling system 34 is provided for cooling support 23 to shield source 24 and detectors 28 from the heat of the rolling mill and to maintain the monitoring system at a stable and non-critical operating temperature.

As will be discussed hereinafter, due to the perspective and projection aspect of divergent beams, changes in size of the article to be profiled are accommodated by moving the head vertically as illustrated by arrow 36 to move source 24 closer to the profiled specimen when the specimen is of relatively smaller size, and to move the source away from the specimen when the specimen is of relatively larger size. This concept is further illustrated in FIG. 3.

Referring back to FIG. 1, the individual detector array outputs are applied as illustrated by arrow 40 to a unit 42 which processes signals representing individual attenuations sensed by the detectors at their predetermined locations. Unit 42 includes circuitry for measuring the attenuation of a beam emanating from the source which impinges on a detector after having passed through the object to be profiled. This attenuation is equal to the integral of the incremental attenuations along the beam. Each beam thus has associated with it a measured attenuation characteristic and a known position relative to the source and other detectors.

As will be seen, utilizing the geometry associated with point perspective and knowledge of what the structural shape should be, with position and attenuation information it is possible to derive not only cross-sectional area, but also geometric conformity to a predetermined shape. The predetermined shape provides a priori information, such as its predetermined geometric relationships (width, height, position of edges, etc.). The a priori information may also include an empirical set of data which is derived by passing an "ideal" section through the head and by measuring the resultant outputs of the detectors. Conformity may then be measured in terms of deviation from this set of data with respect to data taken from a subsequently profiled section.

The output of unit 42 may be utilized to actuate positioning control 44 which in turn positions rollers 14-20 so that any deviation in the structural characteristics of the piece profiled may be automatically corrected in real time. Alternatively, information derived from the system may be used by the operator to make manual adjustments. It is therefore possible to very accurately control weight per foot as the article is being rolled.

In roll forming certain types of sections there are certain parameters which are critical and others that are not. In the I-beam example, web thickness or the thickness of the flanges is more critical, for instance, than the angles between the flanges and the web. One object in roll forming an I-beam is often to produce a product that is within tolerance and has a minimum weight per foot.

Up until the present time it has been standard procedure for the operator to utilize his personal skill and experience to produce an I-beam which lies within tolerance. This traditionally has been on the order of 2.5%. If a 1% tolerance could be achieved, the average weight of the product can be reduced by ¾%. In order to achieve the intended tolerance the operator manually adjusts the position of the rolls which are utilized in the roll forming process. The standard procedure for the operator is to inspect the I-beam as it comes out of the rolling mill and to then compensate for non-conformities utilizing his experience and knowhow. The present system, whether automated or not, gives the operator information which he did not have in the past. It should be noted that by mere visual inspection the operator can not always ascertain which roller to change or which parameter to change in order to obtain the specified weight per foot. In accordance with this invention, it is possible to give the operator instantaneous readouts of web thickness, flange thickness, and the like so that he may manually change the appropriate roller positions.

The above described system is different from tomography systems in which "pictures" are taken of an object at a number of different angles so as to be able to obtain a back projection. With the subject system only one "picture" is taken, and the various profiling parameters are derived by utilization of information about the desired end product. What is done in this invention is to mathematically model the structural section in terms of measured quantities, with the model including functional relationships between the measured X-ray absorptions and the dimensions of the rolled section being profiled. In one embodiment changes in the measured absorptions which occur with small changes in the dimensions and position of the structural shape are used to generate information used to control the process. Since the rolled shape is defined to within 2½ percent by present industrial practice, the present system need only make measurements of increments which are close to a previously known set of values and interrelationships.

As can be seen from the accompanying mathematics, these relationships are extremely complicated if written in a form which takes all variables into account and which deals with them in a complete and exact form. However, because only small variations from the known configuration need be described these complicated relationships reduce to much simpler forms. In fact for the purpose of this invention these relationships need not be known at all. It is only necessary to know empirical relationships which relate the values from the detector array to the resulting dimensions of the product and the effect of these values and dimensions produced by varying the controls of the rolling mill.

In one embodiment the subject invention requires satisfying a series of simultaneous equations which describe the desired position of the surfaces of the piece to be profiled. It is possible to provide a series of equations of the attenuation expected at each one of the detectors as a function of position of the surfaces of the article to be profiled. Depending on the nature of the rolled section there may be as many as twelve unknowns.

By using the additional information provided by the profiling device and the associated mathematical model which is rapidly manipulated within a high speed computer, the finished product may be held to a much closer tolerance than 2½ percent, especially if an automatic roller positioning system is driven in accordance with the output from the subject profiler.

Figure 2:
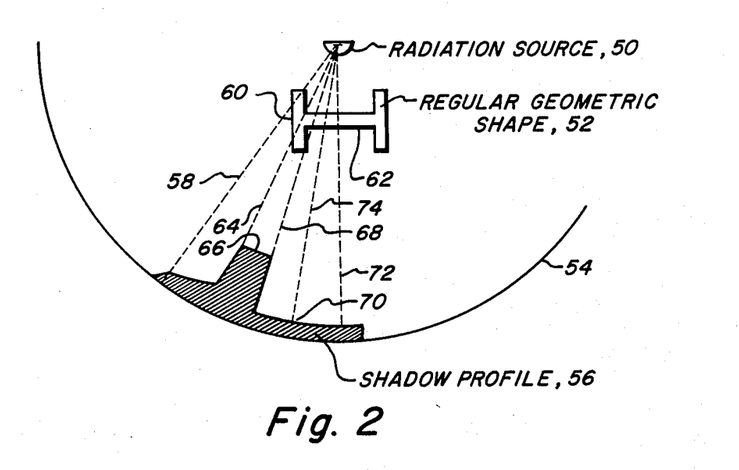
FIG. 2 is a diagrammatic illustration of the shadow profile of an I-beam utilizing a diverging beam radiation pattern.

Referring now to FIG. 2, a radiation source 50 is depicted as a point source, and assuming a regular geometric shape 52 interposed between the point source and an arc 54, then a shadow profile 56 is produced in which the amount of attenuation is reflected in the thickness of the profile. In this figure only one-half of the shadow profile is illustrated. As can be seen, a beam 58 is only slightly attenuated, whereas the joint between a flange 60 and a web 62 along beam 64 produces increased attenuation. The resultant profile is illustrated at 66 and occurs because radiation between beams 64 and 68 passes through increased amounts of material. It will further be appreciated that the shadow profile illustrated at 70 reflects a uniform web corrected, of course, for the angle of the particular beam with respect to the web, since a beam 72 passing perpendicularly through the web will be attenuated slightly less than a beam 74, which does not pass perpendicularly through the web.

Figure 3:
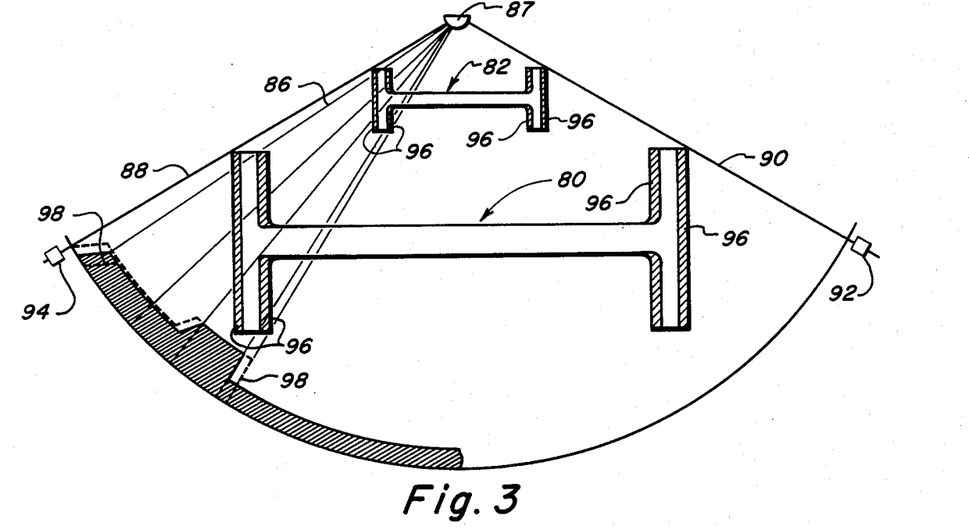
FIG. 3 is a diagrammatic illustration showing the ease with which scaling can be obtained when utilizing a diverging beam system, also indicating the effect of horizontal displacements on the measurements.

Referring now to FIG. 3, one of the aspects of utilizing a diverging beam type system is the ability to measure the conformity of a scaled-up or scaled-down article with a predetermined shape. If I-beam 80 is scaled down to the size illustrated at 82, source 87 is moved closer to the scaled-down article. As illustrated by beam 86, each beam passes through identical parts of the differently scaled specimens. Consequently every scaled-up or scaled-down version when measured in this manner will have a beam passing through an identical geometric part, and thus scaling is rapidly and efficiently accommodated due to the laws of projection and perspective. All that is necessary to position the source with respect to the profiled article is to determine which beams pass just to the outside of the edges of the article to be profiled. These beams are the unattenuated beams 88 and 90 for the I-beams of FIG. 3. Thus, for instance, the head containing the source and detectors may be moved in a vertical direction until such time as detectors 92 and 94 first register an attenuation indicating that the edge of the article to be profiled has simultaneously intercepted beams 88 and 90.

Also illustrated in FIG. 3 is the effect of horizontal displacement on the measuring system in which the shaded areas 96 represent horizontal displacement of the profiled structure caused by vibration. The resultant change in the shadow profile is illustrated by dotted lines 98. Due to the mathematical modeling to be discussed it is possible to detect displacement of the profiled article, e.g. by the utilization of edge detecting apparatus, and to compensate the outputs accordingly. In some mathematical models horizontal position terms drop out so that no compensation is required.

Figure 4:
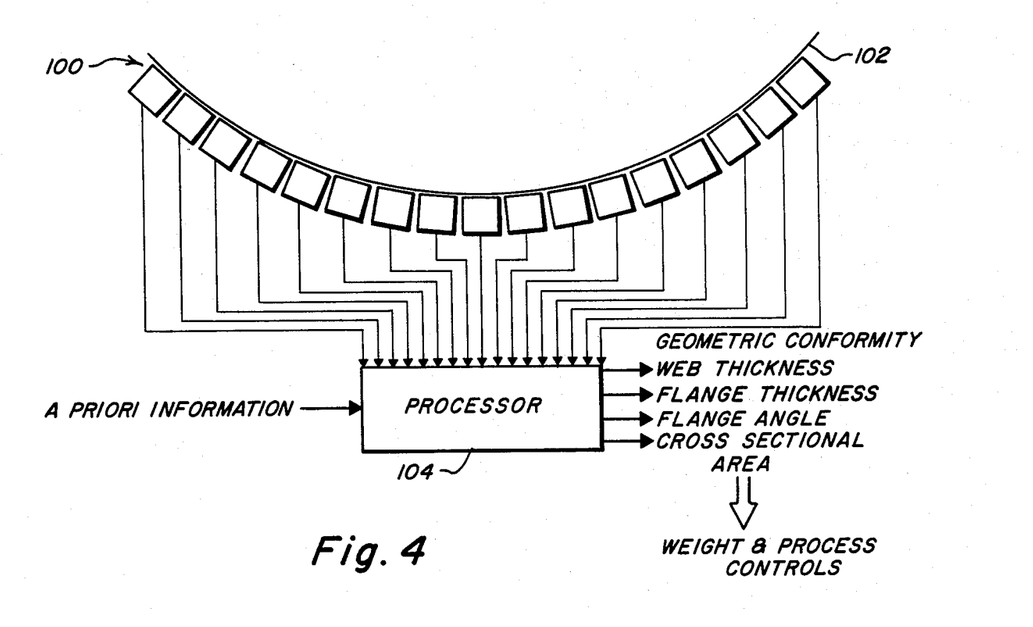
FIG. 4 is a block diagram illustrating the utilization of individual detector outputs and the utilization of a priori information for the determination of attenuation as a function of beam position and geometric conformity to a predetermined model.

Referring to FIG. 4, an array of detectors 100 is positioned on an arc 102. Individual outputs of these detectors are applied to a processing unit 104 which is provided with information not only about the diverging beam geometry but also about the article to be profiled. When an I-beam is profiled the outputs of the processor represent the geometric conformity of the profiled shape to a mathematically ideal shape from which web thickness, flange thickness, flange angle and cross-sectional area may be rapidly calculated. Having calculated these parameters, weight may be rapidly ascertained and control signals generated.

In one embodiment, the detectors in the array 100 are placed so that they fill the entire arc. This results in an output of the detector array being a filtered then sampled version of a continuous profile. This filtering, which occurs because the detectors have a width equal to their spacing, reduces the loss of information. An example of one profiling system along with its mathematics is now presented.

CROSS-SECTIONAL AREA DETERMINATION OF A STEEL BEAM

The ratio of detector current [$I_o$] measured in a clear path, to the detector current [$I_i$] measured with a plate inserted in the path is a measure of the radiation absorption by the plate. Since the material is of uniform density and known coefficient of absorption, $\mu$, the radiation measurement provides a measurement of the length of material penetrated.

$$I_i = I_o e^{-\int \mu \, dl} \qquad \text{(Eq. 1)}$$

where dl is the differential path length.

Hence we have a measure of length given by:

$$L_i = -\frac{1}{\mu} \ln(I_i/I_o) \qquad \text{(Eq. 2)}$$

Consider now the results of moving a very small detector along an arc centered about the X-ray source. At each position along the arc the quantity $$-\frac{1}{\mu} \ln(I/I_o)$$

is computed.

Figure 5:
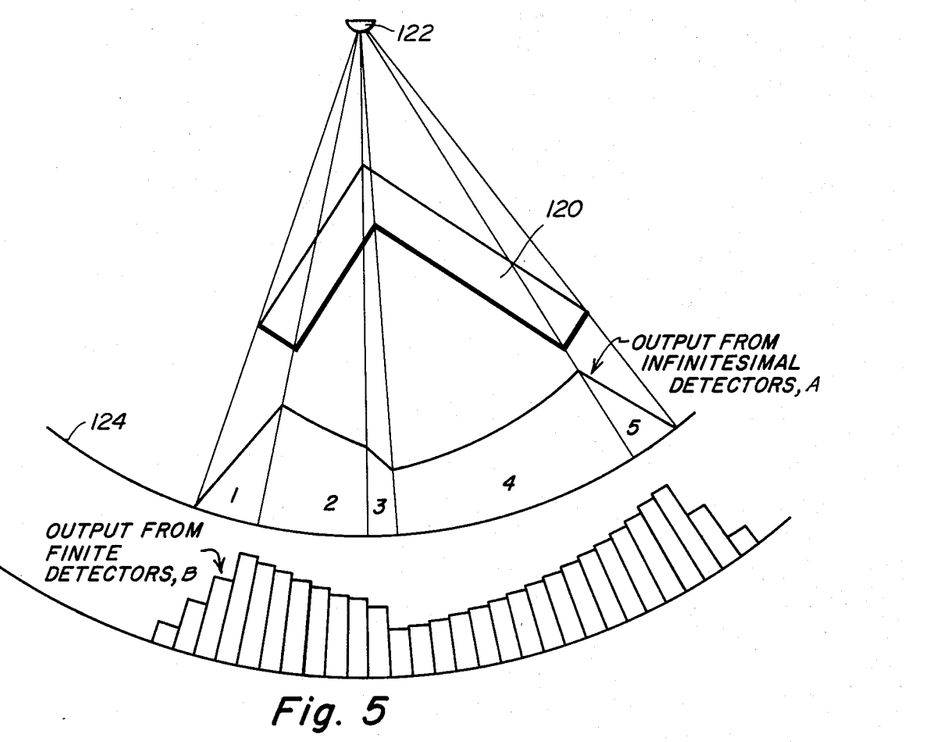
FIG. 5 is a diagram illustrating the measurement of the cross section of an L-shaped structure to be profiled.

More specifically, referring to FIG. 5, an L-shaped section 120 is positioned between a point source 122 and an arc 124. Beams from source 122 to arc 124 passing through geometrically distinct portions of section 120 define zones 1-5 which result in curve A. Curve A is obtained by plotting the output of a very small detector moved along arc 124. The zone 1 and 5 positions of curve A correspond to radiation passing through a triangular shape; zone portions 2 and 4 to radiation passing through a parallel sided shape; and the zone 3 portion to radiation passing through a trapezoidal shape. Curve A can also be considered the output obtained from an array of infinitesimal detectors.

To obtain the results from a finite number of finite detectors, this curve is integrated over the aperture of each detector. To be more precise, the curve is exponentiated to obtain the output off the infinitesimal detector, then integrated to obtain the output of the finite aperture detectors to yield curve B of FIG. 5.

Curve A can be obtained by considering one line element of FIG. 5 at a time and by computing the length of a ray penetrating the section. This length determines the detector output which is inversely proportional to the length of the line through the section.

Figure 6A:
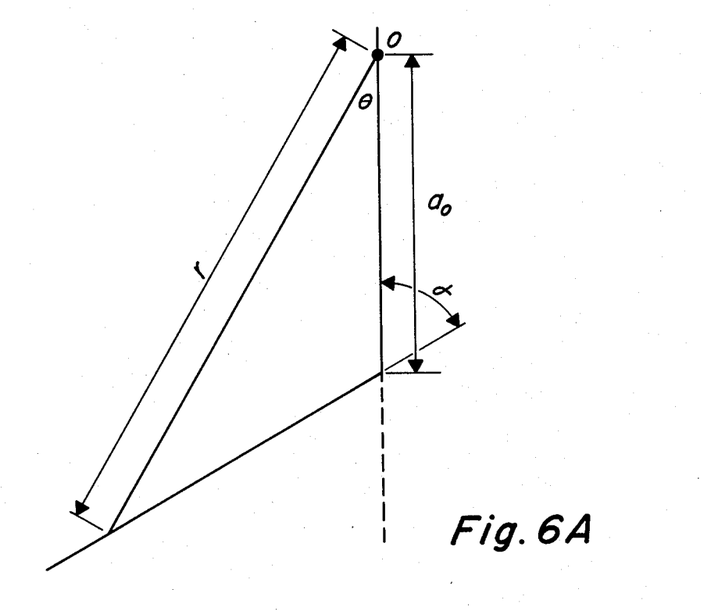
FIGS. 6A and 6B are diagrams illustrating the variables used in equations relating to the profiling of an L-shaped section; and, FIG. 7 is a block diagram illustrating one embodiment of a system utilized for processing the outputs from the configuration-invariant head utilized in the novel profiling system.

In order to derive an algebraic expression for the penetrating ray length, referring to FIG. 6A the length r of a radius from source 0 at an angle $\theta$ is defined by the following equation in terms of a point specified by the intersection of the radius with a line which intersects a vertical center line $C_L$ at an angle $\alpha$ and a distance $a_o$ from source 0:

$$r = a_o \left[ \frac{\cos\theta + \sin\theta \frac{\cos\alpha}{\sin\alpha}}{1 - \frac{\sin^2\theta}{\sin^2\alpha}} \right] \qquad \text{(Eq. 3)}$$

Figure 6B:
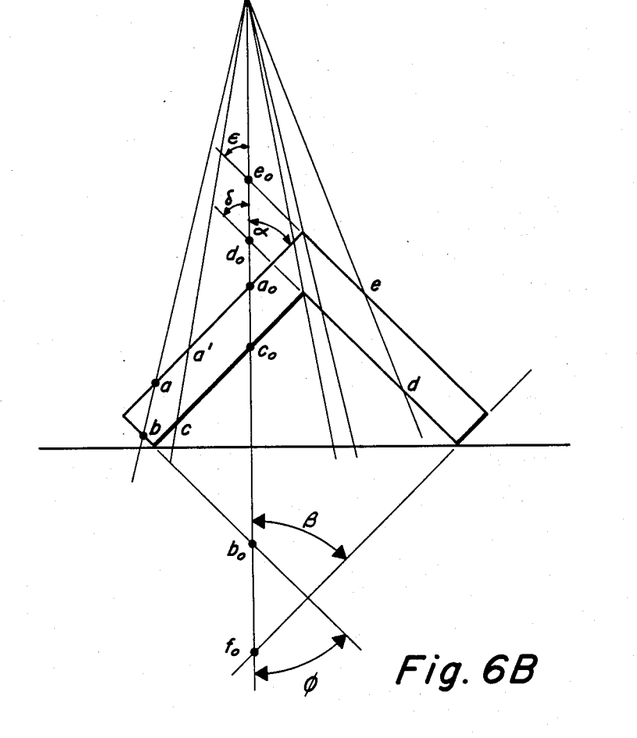

Referring to FIG. 6B, to obtain the desired length of the penetrating ray the radius of the point a at which the ray enters the rolled section is subtracted from the radius of the point b at which it leaves the section.

For region 1 of FIG. 5

$$r_b - r_a = \qquad \text{(Eq. 4)}$$

$$b_o \left[ \frac{\cos\theta + \sin\theta \frac{\cos\beta}{\sin\beta}}{1 - \frac{\sin^2\theta}{\sin^2\beta}} \right] - a_o \left[ \frac{\cos\theta + \sin\theta \frac{\cos\alpha}{\sin\alpha}}{1 - \frac{\sin^2\theta}{\sin^2\alpha}} \right]$$

$$r_c - r_a' = \qquad \text{(Eq. 5)}$$

$$c_o \left[ \frac{\cos\theta + \sin\theta \frac{\cos\beta}{\sin\beta}}{1 - \frac{\sin^2\theta}{\sin^2\beta}} \right] - a_o \left[ \frac{\cos\theta + \sin\theta \frac{\cos\alpha}{\sin\alpha}}{1 - \frac{\sin^2\theta}{\cos^2\alpha}} \right]$$

$$= (c_o - a_o) \left[ \frac{\cos\theta + \sin\theta \frac{\cos\alpha}{\sin\alpha}}{1 - \frac{\sin^2\theta}{\sin^2\alpha}} \right] \quad \text{(Eq. 6)}$$

$$r_d - r_a = \quad \text{(Eq. 7)}$$

$$d_o \left[ \frac{\cos\theta + \sin\theta \frac{\cos\delta}{\sin\delta}}{1 - \frac{\sin^2\theta}{\sin^2\delta}} \right] - a_o \left[ \frac{\cos\theta + \sin\theta \frac{\cos\alpha}{\sin\alpha}}{1 - \frac{\sin^2\theta}{\sin^2\alpha}} \right]$$

$$r_d - r_a = (d_o - e_o) \left[ \frac{\cos\theta + \sin\theta \frac{\cos\delta}{\sin\delta}}{1 - \frac{\sin^2\theta}{\sin^2\delta}} \right] \quad \text{(Eq. 8)}$$

$$r_f - r_e = \quad \text{(Eq. 9)}$$

$$f_o \left[ \frac{\cos\theta + \sin\theta \frac{\cos\phi}{\sin\phi}}{1 - \frac{\sin^2\theta}{\sin^2\phi}} \right] - e_o \left[ \frac{\cos\theta + \sin\theta \frac{\cos\epsilon}{\sin\epsilon}}{1 - \frac{\sin^2\theta}{\sin^2\epsilon}} \right]$$

These expressions show the ability of the system to measure the length of penetration through the sides of a rolled section.

These lengths are $$(b_o - e_o)\cos\alpha \text{ and } (f_o - a_o)\cos\alpha$$

The thicknesses of the plates are $$(c_o - a_o)\sin\alpha \text{ and } (d_o - e_o)\cos\alpha.$$

The cross-sectional area or weight is $$W = (b_o - e_o)\cos\alpha(f_o - a_o)\sin\alpha - (f_o - c_o)\sin\alpha(b_o - d_o)\cos\alpha \quad \text{(Eq. 10)}$$

$$= [(b_o - e_o)(f_o - a_o) - (f_o - c_o)(b_o - d_o)]\sin\alpha\cos\alpha \quad \text{(Eq. 11)}$$

The process by which these parameters are determined may be described as follows. Let the log of the output of the detector at known angle $\theta_j$ be written $D_j$, where $D_j$ is the measured output of the indicated detector.

Then $$D_j = D_j(a_o, b_o, c_o, d_o, e_o, f_o, \alpha, \beta, \delta, \phi, \theta_j) \quad \text{(Eq. 12)}$$

Evaluating $D_j$ for each detector results in a number of simultaneous equations equal in number to the number of detectors. For 76 detectors, 76 equations are obtained, each having 10 unknowns. This provides an over-constrained system so that errors can be reduced through employing standard fitting techniques.

As mentioned hereinbefore, the equations for determining weight can be simplified. More specifically for the L-shaped section of FIG. 6B, when considering the change from an ideal top roller position $a_o$, $a_o$ and $e_o$ will change. The change in weight can be expressed as $$\delta W = \frac{\partial W}{\partial a_o} \delta a_o + \frac{\partial W}{\partial e_o} \delta e_o \quad \text{(Eq. 13)}$$

Thus $$\delta W = [-(b_o - e_o)\delta a_o - (f_o - a_o)\delta e_o]\sin\alpha\cos\alpha \quad \text{(Eq. 14)}$$

$-(b_o-e_o)\delta a_o$ describes the change in area of one side of the L-shaped section, whereas $-(f_o-a_o)\delta e_o$ describes the change in area of the other side. Since $\delta W$ is a small number 2nd order terms can be ignored and Eq. 13 is simplified over Eq. 11.

Since the terms for position drop out of the above equations, it will be appreciated that motion transverse to the direction of motion of the rolled structure does not affect the final result. It is thus seen that the measurements of the penetration lengths of a body along rays of known location allow one to determine the area of that body.

In practice some variables will be rather rigidly related to others because of the nature of the rolling mill, while others will be more freely varying. Writing the model in terms of the adjustments of the rolling mill can reflect this rigidity and flexibility, and also facilitates optimizing the product.

For example, in the case of an I-Beam since the roller ends determine the inside positions of the flange walls, the distance between the two flanges is defined by the lengths of the opposing rollers. However, the thickness of each flange is defined by the relative position of the roller which forms the outside of the flange and the opposing two rollers, the ends of which form the inside of that flange. Thus the flange thickness may vary, both from one side of the I-Beam to the other and in time because of variations respectively in the positions of these three rollers and the thickness of the outside roller. If the mathematics are written such that parameters which depend on the position of rollers and are mixed with parameters which depend on the dimensions of rollers, the usefullness of the mathematics will be diminished as compared to what it would be if these parameters are treated separately.

Figure 7:
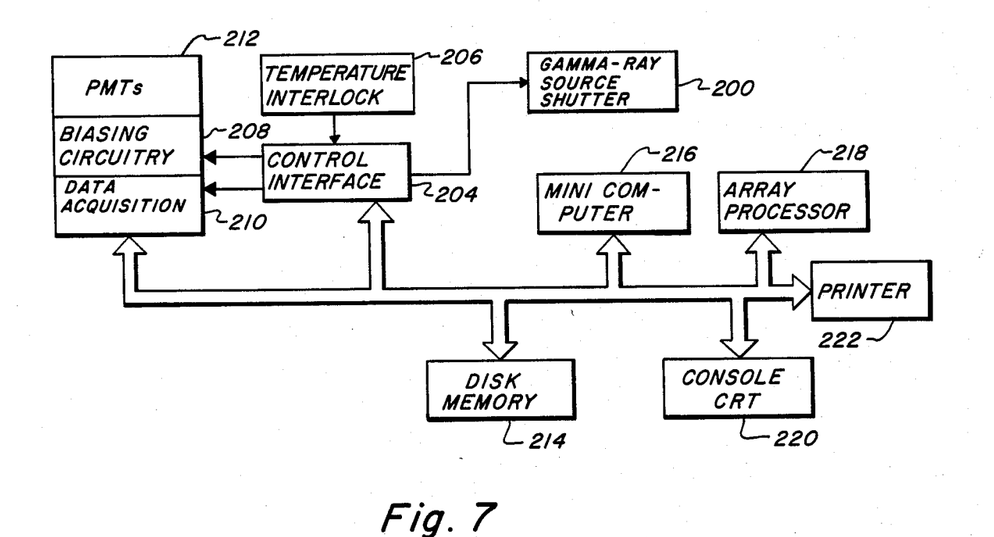

Referring now to FIG. 7, a system for profiling is illustrated in which data has been acquired by utilizing a divergent beam. This system includes a gamma ray source shutter 200 controlled by a control interface 204 which also has as an input a temperature interlock 206. The control interface controls biasing circuitry 208 and data aquisition circuitry 210. Biasing circuitry 208 is utilized in the control of photomultiplier tubes (PMTs) 212 which are the detectors for the array located in the head.

The output of the data aquisition circuitry is applied to a disk memory 214, is utilized by control interface 204, and is applied to a computer 216 such as a PDP11/04 manufactured by Digital Equipment Corporation, as well as to an array processor 218, such as Analogic Corp. Model AP400, with the entire system being monitored at a console CRT type display 220. A printer 222 is utilized for hard copy readout. The operation of the system in FIG. 7 is as follows.

Data representative of the I-beam having been penetrated by the X-rays is stored in disk memory 214 along with the dimensions of the various shaped articles which are to be measured. In addition, the disk also stores equations and fitting algorithms. Operational control is maintained by computer 216 which includes sequence control of the overall operation, control of disk memory 214 and control of array processor 218.

At startup, data corresponding to algorithms for equation fitting, cross sectional area computation and dimension error correction is loaded into the array processor, with dimensional error correction data being used to generate feedback signals for improved production thickness control. During operation, data is also fed into the buffered array processor memory where it is processed to determine the cross-sectional area and dimension error correction. The console CRT 220 provides for display of control commands and system operation status reports. Hard copy of the cross-sectional area of the profiled article is provided by printer 222.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for profiling a structural section having a spatial extent defining first and second outside edges, comprising:
   a source for providing a fan-beam of penetrating radiation a portion of which passes through substantially the entire spatial extent of the structural section, and other portions of which pass through first and second regions respectively outwardly spaced from the first and second outside edges of the structural section;
   an array of detectors spaced from the source having a first plurality of detectors responsive to the portion of the fan-beam of radiation which passes substantially through the entire spatial extent of the structural section to provide first data respectively representative of the thickness of corresponding ones of a plurality of predetermined physically adjacent regions of the structural section through which the fan-beam passes from the source to corresponding ones of the detectors of said first plurality of detectors, said regions together encompassing substantially the entire spatial extent of the structural section;
   said array of detectors having a second and a third plurality of detectors disposed on respective ends of said first plurality of detectors of said array of detectors responsive to the portions of the fan-beam of radiation which pass through the first and second regions respectively outwardly spaced from the first and second outside edges to provide second data respectively representative of the location of said first and second outside edges; and
   means connected to the array of detectors including a processor and an associated memory having stored data representative of an ideal two-dimensional cross-section of the structural section, said means being operative in response to said first thickness data respectively representative of corresponding ones of said predetermined physically adjacent regions which together encompass the entire spatial extent of said structural section, and to said second outside edge location data respectively representative of the location of said first and second outside edges, to provide third data representative of the deviations of the two-dimensional cross-section of the structural section relative to the ideal two-dimensional cross-section.

2. The invention of claim 1, further including a support having opposed arms defining a structural section receiving interspace therebetween; said source being disposed on one of said opposed arms; said array of detectors being disposed on the other of said opposed arms defining a configuration-invarient head.

3. The invention of claim 2, wherein said support has a C-shape.

4. Apparatus for obtaining the weight per unit length of a structural section having a spatial extent defining first and second outside edges, comprising:
   a source for providing a fan-beam of penetrating radiation a portion of which passes though substantially the entire spatial extent of the structural section, and other portions of which pass through first and second regions respectively outwardly spaced from the first and second outside edges of the structural section;
   an array of detectors spaced from the source having a first plurality of detectors responsive to the portion of the fan-beam of radiation which passes substantially through the entire spatial extent of the structural section to provide first data respectively representative of the thickness of corresponding ones of a plurality of predetermined physically adjacent regions of the structural section through which the fan-beam passes from the source to corresponding ones of the detectors of said first plurality of detectors, said regions together encompassing substantially the entire spatial extent of the structural section;
   said array of detectors having a second and a third plurality of detectors disposed on respective ends of said first plurality of detectors of said array of detectors responsive to the portions of the fan-beam of radiation which pass through the first and second regions respectively outwardly spaced from the first and second outside edges to provide second data respectively representative of the location of said first and second outside edges; and
   means connected to the array of detectors including a processor and an associated memory having stored data representative of an ideal two-dimensional cross-section of the structural section, said means being operative in response to said first thickness data respectively representative of corresponding ones of said predetermined physically adjacent regions which together encompass the entire spatial extent of said structural section, and to said second outside edge location data respectively representative of the location of said first and second outside edges to provide third data representative of the weight of the structural section per unit length.

5. The invention of claim 4, further including a support having opposed arms defining a structural section receiving interspace therebetween; said source being disposed on one of said opposed arms; said array of detectors being disposed on the other one of said opposed arms defining a configuration-invariant head.

6. The invention of claim 5, wherein said support has a C-shape.

* * * * *